United States Patent [19]

Schaeffer

[11] 4,071,066
[45] Jan. 31, 1978

[54] UNDERWATER CAMERA CASING

[75] Inventor: Merle J. Schaeffer, Silver Spring, Md.

[73] Assignee: National Geographic Society, Washington, D.C.

[21] Appl. No.: 777,937

[22] Filed: Mar. 15, 1977

[51] Int. Cl.² ........................................... G03B 17/56
[52] U.S. Cl. .................................... 150/52 J; 354/64
[58] Field of Search ....................... 150/52 J; 354/64; 352/242

[56] References Cited

U.S. PATENT DOCUMENTS

| 1,535,312 | 4/1925 | Hosking | 352/242 |
| 3,036,506 | 5/1962 | Andresen | 150/52 J X |

FOREIGN PATENT DOCUMENTS

| 58,117 | 10/1940 | Denmark | 354/64 |
| 1,130,523 | 10/1956 | France | 354/64 |
| 412,561 | 11/1966 | Switzerland | 352/242 |
| 821,235 | 10/1959 | United Kingdom | 354/64 |

*Primary Examiner*—Donald F. Norton
*Attorney, Agent, or Firm*—Dos T. Hatfield

[57] ABSTRACT

An underwater camera casing is formed as a pouch of molded flexible waterproof material with front, back and side walls forming an upper body space adapted to contain a camera and a lower space into which a hand may be inserted for insertion of the camera. The side wall is provided with a side opening extending from the top of one side of the upper and lower body spaces to the top of the other side of the upper and lower body spaces. An opening is provided through the front wall of the upper body space into which a removable waterproof lens unit may be inserted to be detachably connected to a camera body removably positioned within the pouch camera body space thus securing the camera body within the pouch. Waterproof sealing means is provided for the lens opening for the lens unit and a waterproof closure is provided for the side opening.

6 Claims, 4 Drawing Figures

U.S. Patent Jan. 31, 1978 4,071,066
FIG. 1
FIG. 2
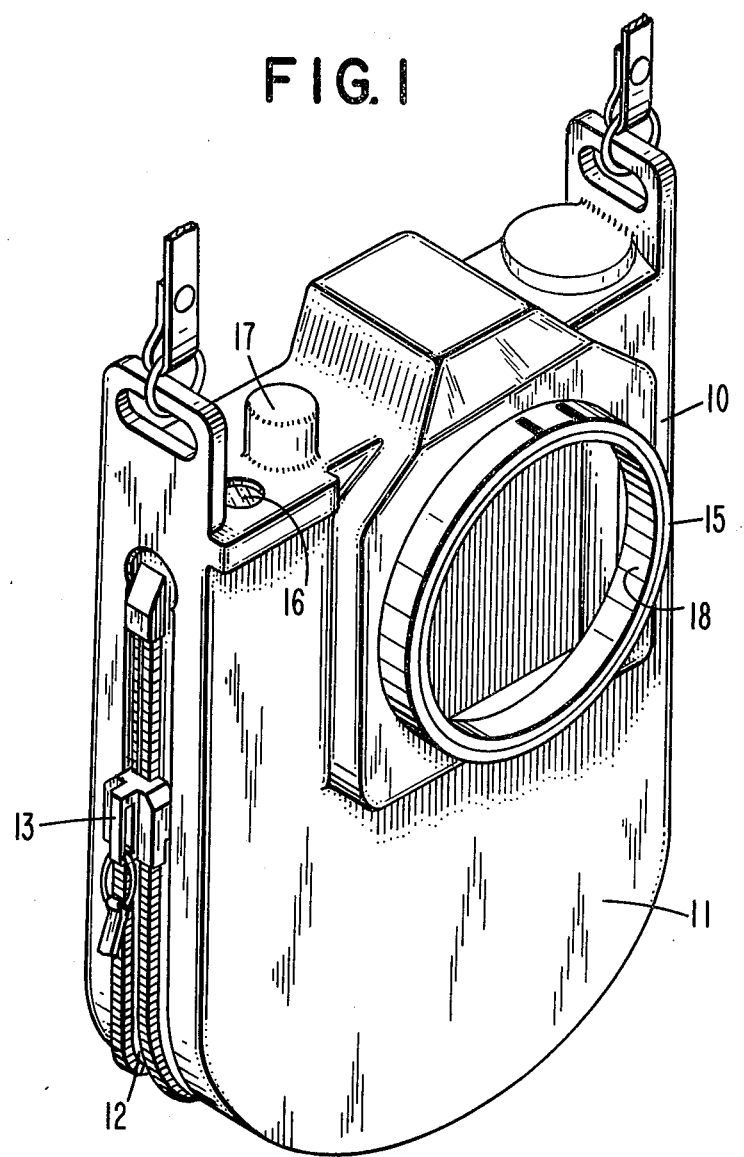
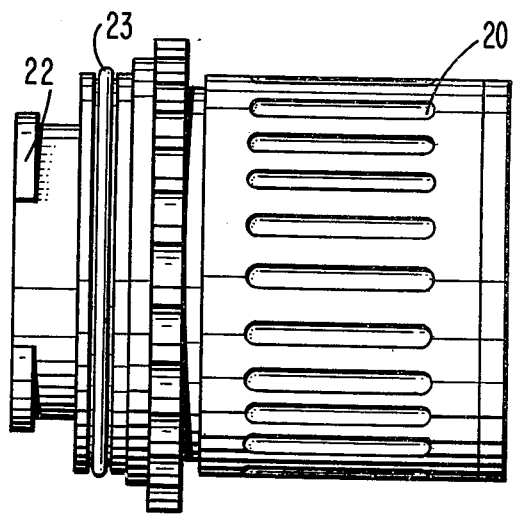

UNDERWATER CAMERA CASING

BACKGROUND OF THE INVENTION

Some very excellent cameras are constructed with pushbutton operated motor driven exposure and film advance mechanisms and also have detachable and interchangeable lens units that are secured to the camera body by bayonet or screw threaded attachments or the like. These cameras, particularly the through the lens reflex types, are ideal for underwater use if they can be suitably enclosed in a waterproof casing and, of course, it is desirable that such casing be easy and reliable to use, while at the same time being inexpensively constructed in a durable form.

PRIOR ART

The following patents disclose waterproof camera housings of the general type referred to but they do not disclose an arrangement specifically intended for use in particular cooperation with a camera body having a removable lens unit, as provided by the subject invention:

U.S. Pat. No. 3,026,784 Byers
U.S. Pat. No. 3,162,107 Byers
U.S. Pat. No. 3,838,434 Hughes et al

SUMMARY OF THE INVENTION

According to this invention a waterproof camera casing is formed as a pouch of flexible molded waterproof material, such as rubber, plastic, synthetic rubber or the like. The pouch is molded to have front and back walls with side walls extending all around to form an upper camera body portion and a lower body portion with a side opening extending in the side wall from the top of one side of the upper and lower body spaces to the top of the other side of the upper and lower body spaces. A waterproof closure, such as a waterproof zipper, is provided for the side opening and the lower body space enables a human hand to insert and position a camera body in the upper camera body space of the pouch when the side opening zipper is opened. A lens opening is provided in the front wall of the upper body space through which a detachable lens unit may be extended to connect with and secure the camera body in position within the pouch. Suitable waterproof sealing means, such as a simple O-ring, provides a water tight connection between the lens unit and the pouch wall when the lens is inserted and connected to the camera body within the pouch. Since the molded pouch is formed of flexible material, a protrusion may be preformed in the molded body into which the camera trigger mechanism may extend to be operated by suitable external trigger pressure on the protrusion. Also, transparent openings may be provided in the pouch walls at appropriate points to enable the functions of the camera and sighting through the lens unit to be observed. In a preferred form of the invention, the lens opening in the front wall of the pouch may be formed as a ring of relatively hard material to provide a secure placement and attachment of the camera body within the pouch when the lens unit is inserted through the lens opening and connected to the camera body.

Other features and advantages of the invention will be apparent with reference to the following description in connection with the drawings.

DESCRIPTION OF THE DRAWINGS

FIG. 1 is a perspective elevation of the pouch;
FIG. 2 is a side elevation of a removable waterproof lens unit that may be used with the invention.

DETAILED DESCRIPTION OF THE INVENTION

Figure 3:
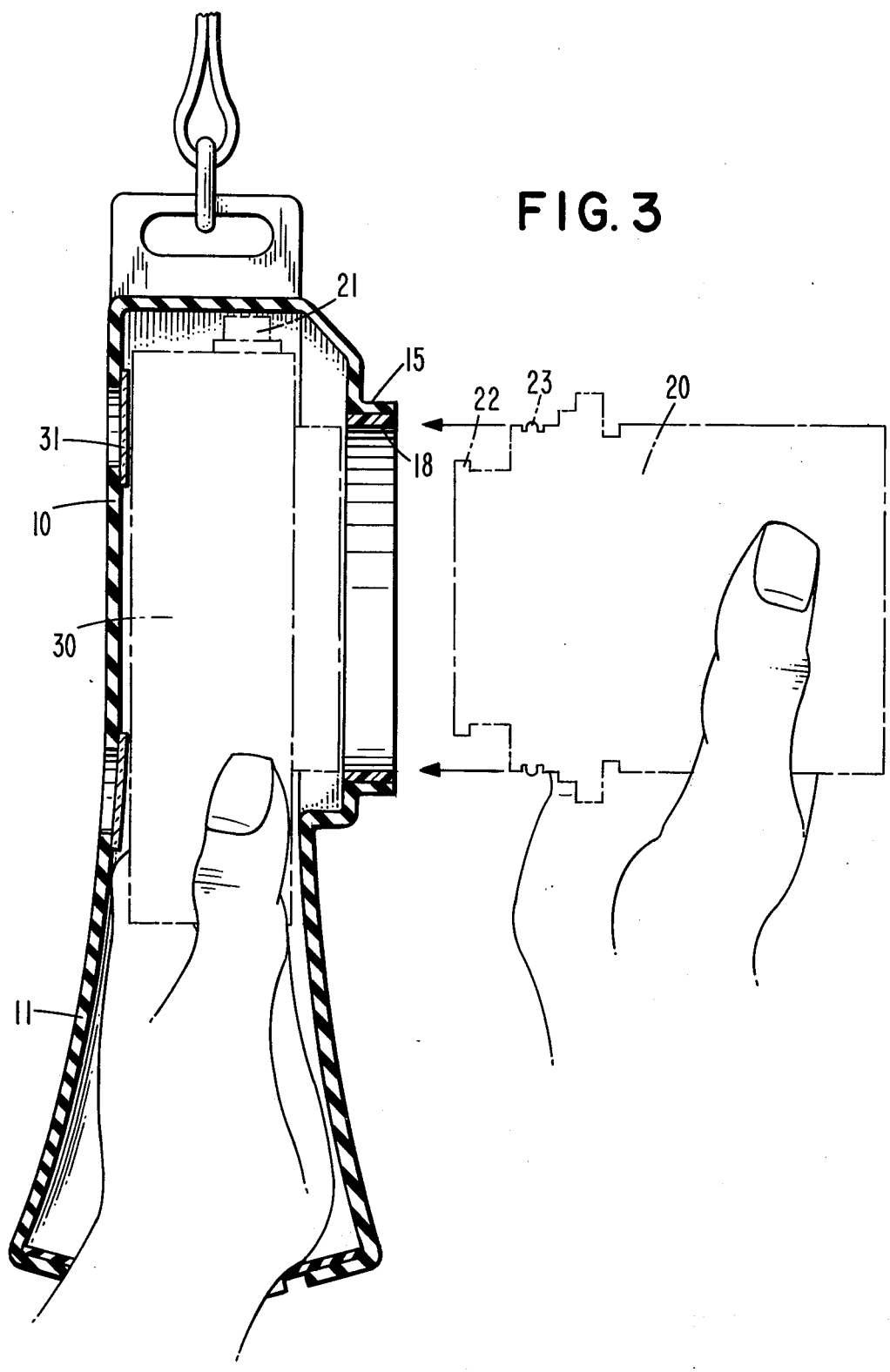
FIG. 3 is a side sectional view showing the manner of assembling the camera and lens to the waterproof pouch.

Referring to the drawings, and most particularly to FIG. 1 of the drawings, the waterproof camera housing of the invention is shown as a molded preformed pouch body constructed to have front and back walls with a side body wall extending all around and made of flexible and waterproof sheet material, such as rubber or the like, to a form providing an upper camera body space 10 and a lower space 11. An opening 12 extends around the side wall of the pouch from the top of one side of the camera body space 10 to the top of the other side of the body space and a waterproof closure, such as a zipper 13, is provided therefor. The upper front wall of the pouch is provided with a lens opening 15 adjacent the camera body space 10 through which a removable waterproof lens unit 20 (FIG. 2) may extend when assembled to a camera body within the pouch. A transparent window 16 enables the exposure number indicator of the camera body to be viewed externally when the camera is in place. A flexible protrusion 17 is preformed as shown and the camera trigger 21, see dotted lines of FIGS. 3 and 4, may extend into the protrusion to be depressed by external manual pressure thereon for operating the camera, which as previously mentioned, may be of the motor driven exposure release and film advance type operated by a single trigger machanism, as well known in the camera art.

Figure 4:
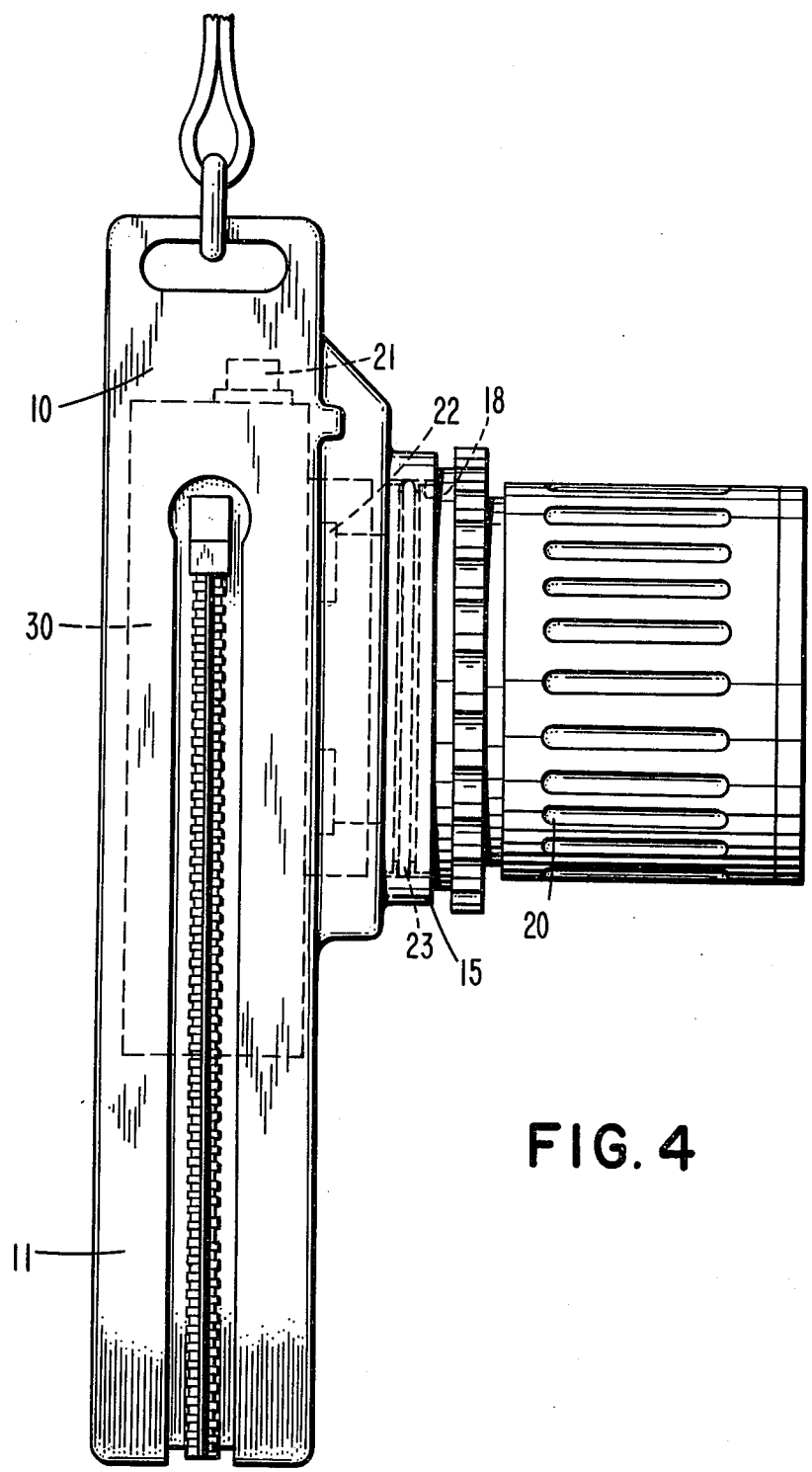
FIG. 4 is a side elevation view of the waterproof pouch with camera enclosed and assembled to the removable lens unit.

As shown in FIG. 2, a waterproof adjustable lens unit 20 having bayonet connections 22 for detachable connection to a camera body is used with the waterproof casing of the present invention. A simple O-ring seal 23 may be applied to the lens unit 20 or alternatively may be positioned within the lens opening 15 to provide a waterproof seal when the camera and lens are assembled to the waterproof pouch, as shown by FIGS. 3 and 4 of the drawing. In the preferred form of the invention, the lens opening 15 is circular to cooperate with a circular removable lens unit 20 but it is obvious that the lens opening may have any suitable configuration to conform to a particular configuration of removable lens unit other than circular. Also, in the preferred form of the invention the lens opening 15 is provided with a relatively hard inner ring surface 18 (FIG. 3) to which the O-ring 23 adheres and which provides a more substantial support for the camera body 30 (FIGS. 3 and 4) when secured within the upper camera body space by attachment to the lens unit 20 extending through the lens opening 15.

It is assumed that the preferred form of camera to be used with the waterproof pouch of the invention is a through the lens reflex sighting and focusing type and a transparent viewing window 31 may be provided, as shown by FIG. 3, to enable the camera to be sighted and focused in use. Of course, other forms of cameras may be used, in which case the transparent apertures for using such other types of cameras would be suitably provided in a manner obvious to those skilled in the art.

FIG. 3 of the drawings shows the manner of positioning for assembly of the camera body 30 within the upper body space 10 by one human hand inserted through the lower space 11 when the zipper closed opening 12 is open and with the other human hand inserting the lens unit 20 for attachment to the camera body 30.

It is believed that all of the features and advantages of the invention are now apparent and fully described and additional description of the use of the invention would be redundant. Various obvious modifications within the scope of the appended claims will occur to those skilled in the art. For example, a flap type waterproof closure (not shown) could be provided in place of the waterproof zipper closure that has been specifically described and threaded lens units may be used instead of the bayonet connection type as described.

What is claimed is:

1. An underwater camera casing comprising, a pouch of molded flexible waterproof material having front, back and side walls formed in a contour to provide an upper body space into which a camera may be inserted and a lower body space into which a human hand may be inserted for insertion and placement of a camera body within the pouch, the side wall of said pouch having a side opening extending around the upper and lower body spaces from one side to the other side, a water pressure resistant closure for said side opening, the front wall of said pouch in the upper body space having a lens opening with a relatively hard inner ring surface into which a removable waterproof lens unit may be passed to be detachably secured to a camera body within the pouch thus aligning and removably securing the camera body within the pouch, and sealing means for said lens opening.

2. The invention of claim 1 in which at least one transparent waterproof opening is provided in the back wall of the upper camera body space for observation of camera functions.

3. The invention of claim 2 in which the upper side wall of the pouch is provided with a preformed flexible molded protrusion into which a camera trigger may extend to be operated by appropriate external pressure thereon.

4. The invention of claim 1 in which the upper side wall of the pouch is provided with a preformed flexible molded protrusion into which a camera trigger may extend to be operated by appropriate external pressure thereon.

5. The invention of claim 1 in which said water pressure resistant closure is a waterproof zipper.

6. The invention of claim 5 in which the lens opening is circular and the pressure resistant sealing means in an O-ring.

* * * * *